May 23, 1944.   E. UTTERBACK ET AL   2,349,777
METHOD AND APPARATUS FOR SEPARATING ENTRAINED MATERIAL FROM GASES
Filed Oct. 28, 1941   3 Sheets-Sheet 1

INVENTORS
ERNEST UTTERBACK & WILLIAM A. HAGERBAUMER
BY
Oswald G. Hayes
ATTORNEY

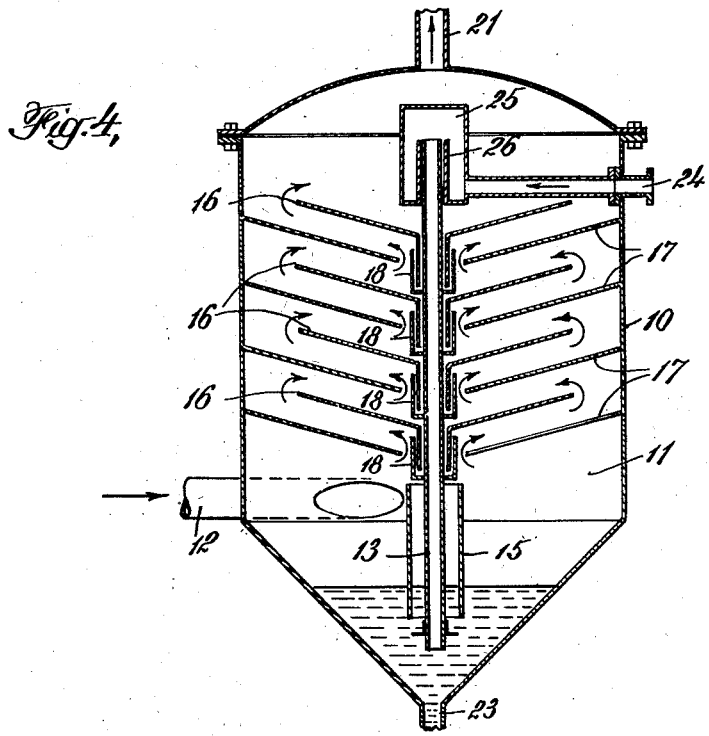
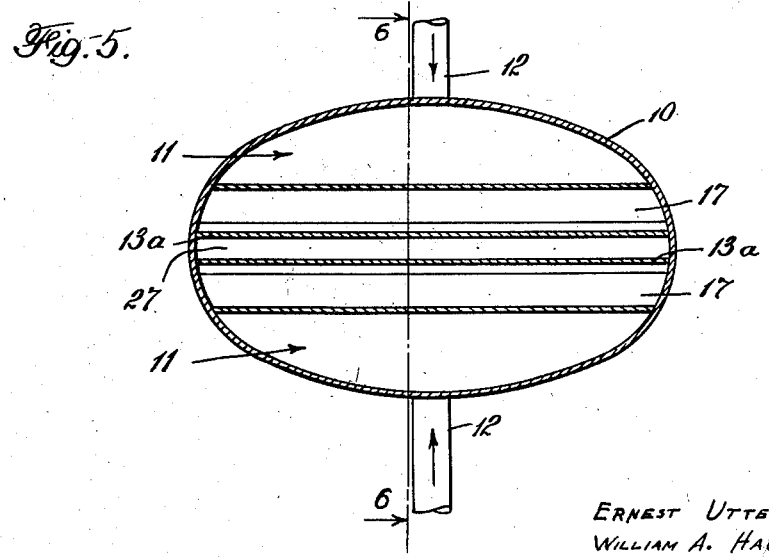

May 23, 1944.  E. UTTERBACK ET AL  2,349,777
METHOD AND APPARATUS FOR SEPARATING ENTRAINED MATERIAL FROM GASES
Filed Oct. 28, 1941  3 Sheets-Sheet 3
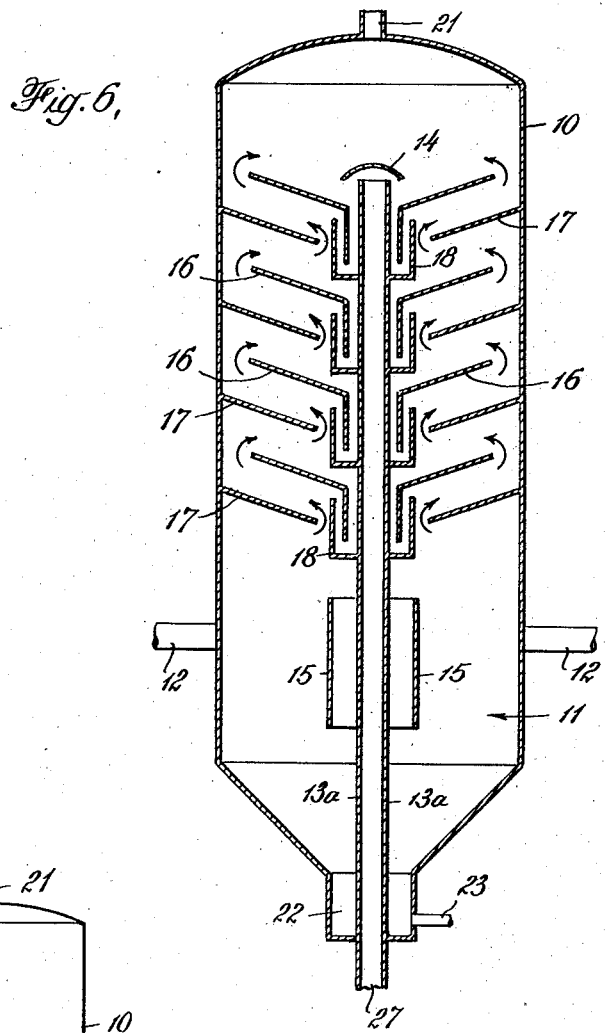
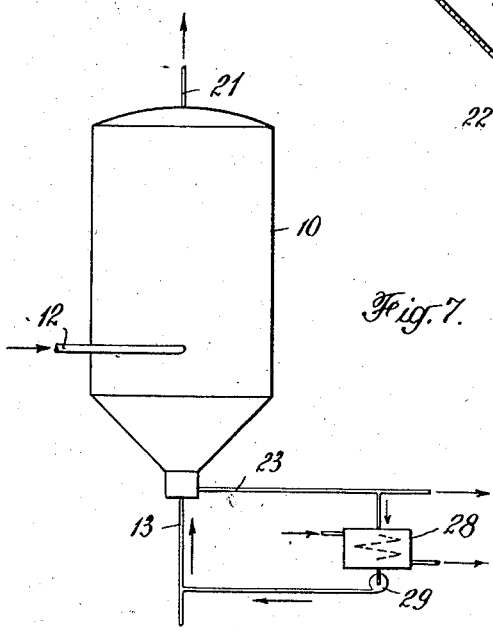
ERNEST UTTERBACK &
WILLIAM A. HAGERBAUMER
INVENTORS
BY
ATTORNEY Patented May 23, 1944

2,349,777

UNITED STATES PATENT OFFICE 2,349,777

METHOD AND APPARATUS FOR SEPARATING ENTRAINED MATERIAL FROM GASES

Ernest Utterback, Upper Darby, and William A. Hagerbaumer, Merwood Park, Pa., assignors to Socony-Vacuum Oil Company, Incorporated, New York, N. Y., a corporation of New York Application October 28, 1941, Serial No. 416,812

5 Claims. (Cl. 261—112)

This invention relates to a method and apparatus for separating entrained matter (solid and/or liquid) from gases and is particularly concerned with process and means involving the use of a vertical surface wetted with a film of a liquid capable of trapping and holding such entrained matter. In one of its preferred embodiments, the invention contemplates removal of tars and the like from vaporized hydrocarbon oils, such as gas oil to be charged to a catalytic cracking unit.

While cracking operations in general require removal of tar from the charge in order to avoid excessive deposition of solid carbonaceous matter in the cracking zone, the problem is acute in catalytic cracking operations where the efficiency of the reaction apparently depends largely on the condition of the surface of the catalytic bodies employed. Fouling of that surface by deposition of carbonaceous solids renders it necessary to remove the catalyst from cracking operation and regenerate it by oxidation of the deposits. Although regeneration at intervals is requisite to efficient operation with any known charging stock, the ratio of time on stream to time spent in regeneration may be substantially increased by careful preparation of the charging stock to remove therefrom heavy tarry material which is particularly subject to extensive decomposition in the catalyst chamber with formation and deposition of contaminating matter.

In preparing the stock it is customary to fractionate a reduced crude, i. e., a crude from which the fractions boiling in the range of gasoline and lower have been removed, to obtain a light gas oil charging stock having an end point of 700° F. to 750° F. and a heavier fraction which is then subjected to a viscosity breaking operation to obtain a further yield of suitable charging stock for the catalytic cracking operation. At some point in this process of preparing a charging stock preferably before separation into light gas oil charging stock and a heavy fraction for viscosity breaking, the tars are separated out by vaporizing the oil and removing tar in the form of a viscous liquid from the vapors. This step is commonly regarded as a vaporizing operation since it serves to provide oil in the vapor state for further treatment. The novel aspects of this invention, however, are peculiarly directed to the feature of tar separation, and to other related operations wherein entrained matter is to be removed from a gas.

In its broader aspects the invention contemplates a method and apparatus for separation of entrained matter by causing the gas under treatment to impinge at substantial velocity against a substantially vertical surface down which is flowed a liquid, the path of the gas being a curve tangential to said surface in the region of impingement. Preferably the gas flow is countercurrent to liquid flow at the region of impingement, and it has been found desirable to lessen power losses due to resistance to gas flow while taking full advantage of high velocity impingement by effecting flow of gas at varied velocity with the maximum velocity in said curved path adjacent the entrapping liquid.

The invention also contemplates certain novel structural elements and control features shown in the annexed drawings wherein:

Figure 4 represents diagrammatically a preferred form of the device incorporating means for controlling the feed of entrapping liquid;

Figure 5 is a horizontal section through a modification of the apparatus;

Figure 6 is a vertical section on line 6—6 of Figure 5; and

Figure 7 is a diagrammatic showing of the separator with its circuit for recirculation of entrapping liquid.

Figure 1:
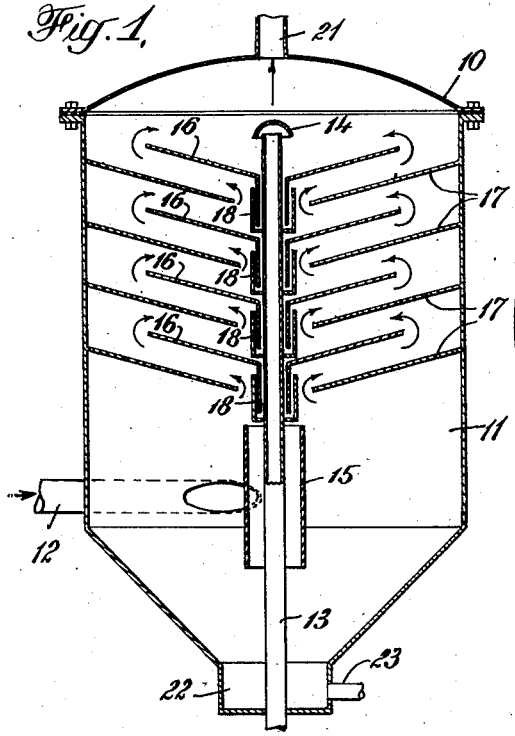
Figure 1 is a diagrammatic vertical section of one embodiment of the apparatus of this invention.
Figure 2:
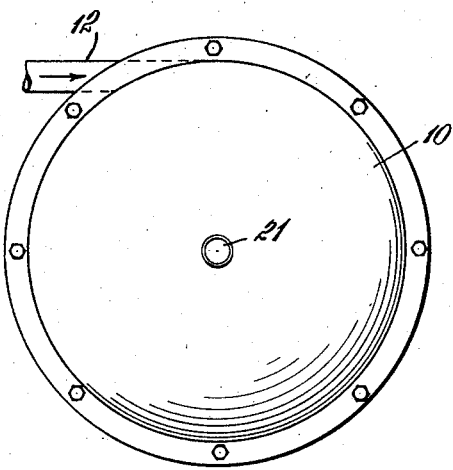
Figure 2 is a top plan of the apparatus of Figure 1.

Referring specifically to Figures 1 and 2, the apparatus in preferred form comprises a cylindrical casing 10 defining a separation chamber 11 into which gaseous material containing entrained matter may be charged through inlet pipe 12 and a suitable port through casing 10. Extending upwardly from the bottom of casing 10 is an inlet pipe 13 for entrapping liquid, surmounted by a cap 14 supported thereon by any suitable means, such as a spider (not shown). A sleeve 15 is preferably disposed about the pipe 13 and supported therefrom as by a spider (not shown) in the neighborhood of the inlet port from pipe 12 to prevent undue interference between gaseous material and entrapping liquid in this zone. It will be observed that the lower portion of the chamber 11 in this embodiment acts much like a conventional cyclone separator, resulting in release of a part of the entrained matter before the gases are forced into contact with the entrapping liquid.

Figure 3:
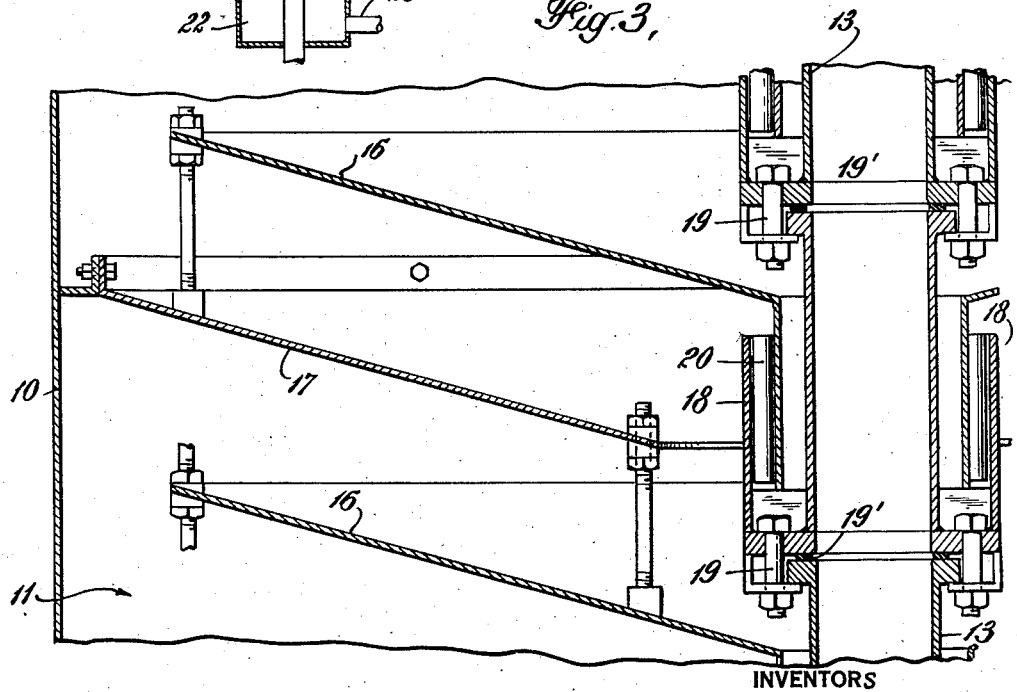
Figure 3 is a detail partial longitudinal section of the internal structure of a chamber according to the present apparatus.

Above the cyclone separator zone there is provided a gas and liquid contact zone wherein the gases are repeatedly brought into contact with entrapping liquid flowing down the outside of pipe 13 from the top thereof. The means for causing this repeated contact are a plurality of inner baffles 16 secured to the periphery of the pipe 13 and a plurality of outer baffles 17 secured to the inner surface of casing 10 and disposed between each pair of adjacent inner baffles 16. The inner baffles 16 are generally frusto-conical in shape and are secured to the periphery of pipe 13 in the manner shown in detail in Figure 3. The inner edge of each baffle 16 is formed with a depending lip extending into a U-shaped trough 18 fastened to the pipe 13, as by welding. Bolts 19 are passed through suitable openings in the bottom of the trough and retain sections of the pipe 13, each bearing a trough 18 by bearing, either directly or indirectly as shown, against lugs on the next lower section. Gaskets 19' are interposed between adjacent sections, resulting in a sturdy, easily assembled apparatus. Spacing bars 20 are interposed between the depending lip of baffle 16 and the wall of trough 18 to maintain each of the elements suitably spaced from each other and from the pipe 13. The connection shown in Figure 3 is repeated about the periphery of pipe 13 so many times as may be necessary to provide a sufficiently rugged structure. If desirable, additional strength may be given by vertical rods passing through and secured to the upper and lower ends of the casing 10 and each of the baffles 16 and 17, although the use of bolts as shown is preferred for ease in assembly.

The baffles 17 extend inwardly and downwardly substantially parallel to the baffles 16 from the casing 10 to which they are secured by welding, rivets, bolts or the like in known manner. In combination, the baffles 16 and 17 form a tortuous passage through which the gases under treatment must pass to reach an outlet 21 centrally disposed in the top of the casing. Entrapping liquid flowing down the outside of pipe 13 accumulates in each trough 18 associated with a baffle 16 forming a liquid seal which effectually prevents upward flow of gases between the baffles 16 and the pipe 13, and also acts to distribute the liquid evenly about the pipe 13 at each of the said liquid seals. In the embodiment of Figure 2, the velocity of the gas will be at a maximum as it impinges against the entrapping liquid on pipe 13 and the inertia of entrained solids and liquids will result in these particles being brought into contact with the entrapping liquid under such conditions of speed and direction of travel that they will become immersed in that liquid and retained. Because of the large cross-sectional area of the passage around the outer edges of baffles 16, the gas passing therethrough will have a minimum velocity thus materially reducing resistance and power losses.

As shown, the lower portion of the casing 10 tapers inwardly toward a sump 22 from which liquid may be removed through pipe 23, containing material removed from the gas both in the cyclone separator and gas and liquid contact zones of the chamber 11.

As a typical example of the operation of the apparatus and process, a reduced crude is heated to suitable temperature, about 900° F., without cracking and passed to the chamber 11 together with superheated steam to aid in vaporization. The light and heavy oils of the reduced crude containing entrained liquid particles of tar are then subjected to a cyclone separation step in the lower part of chamber 11 by reason of the tangential direction of admission thereto. A portion of the tar will thus be thrown out of suspension and flow toward the sump 22 down the walls of casing 10.

Simultaneously a suitable flux oil, as, for example, tar withdrawn from the sump 22, is passed in through the pipe 13 and thereby caused to flow down the outside of said pipe through the liquid seals between that pipe and baffles 16. The vapors from the cyclone separator zone pass generally upward in the direction of the arrows of Figure 1, losing the remainder of the entrained tar at points of contact with the flux oil, which then flows to the sump 22 and picks up the tar separated in the cyclone separator zone. The flux is then withdrawn through line 23 and may be recirculated in whole or part through pipe 13 to act again as entrapping liquid. The vapors removed through 21 are substantially free of tar and after fractionation to produce a stock having an end boiling point of 700° F.–750° F. are suitable for catalytic cracking operations. The heavier oils obtained in the fractionation may be viscosity broken and passed to the tar separator and vaporizer together with heated fresh feed.

In the above operation, it is, of course, important to use a flux oil having a boiling point above the temperatures prevailing in the chamber 11, not only to prevent loss of flux oil, but also to avoid unbalancing the system due to absorption of heat of vaporization by the flux. The heat conditions should be so adjusted that there will be no tendency to vaporization of the flux and consequent displacement of equilibria for which the system was designed, either by vaporization of flux or condensation of vapors under treatment.

The apparatus illustrated in Figure 1 requires control of the feed of entrapping liquid to avoid flooding the baffles 16 through a flow in excess of the capacity of the liquid seals. This invention, however, contemplates also a modification, as shown in Figure 4, to provide automatic control of liquid flow independent of feed rates. In this embodiment, the pipe 13 is utilized as an overflow outlet. Entrapping liquid is fed in through line 24 to a reservoir 25, otherwise enclosed except for an opening in the bottom about the upper end of pipe 13. A dam 26 forms an annular wall about the said opening over which the entrapping liquid flows to pass down the outside of pipe 13. In the event of feed in excess of that which the apparatus is designed to handle, greater than the capacity of the liquid seals, the excess will flow over the upper edge of and down through the pipe 13.

It has been pointed out, in connection with Figure 1, that the entrapping liquid should have a sufficiently high boiling point to prevent unbalance of the system due to vaporization of the entrapping liquid. Where the separated tar is used for that purpose after cooling to a temperature at which it will neither vaporize nor decompose, the possibility of heat exchange between the liquid and vapors will be practically negligible due to the small area of contact between gas and liquid. However, elevation of the temperature of the entrapping liquid, even though its effect in cooling the gases will be slight, may be detrimental by reason of vapors from a tar entrapping liquid contaminating the vapor or by reason of decomposition of the entrapping liquid to coke up the chamber. The modification shown in Figure 4 is capable of operation in a manner to inhibit these possible undesirable conditions. If a substantial excess of cooled entrapping liquid be passed in through the pipe 24, the considerable flow through pipe 13 will act as heat exchange medium to restrain the tendency to elevated temperature of the liquid in contact with the vapor. The overflow would also tend to maintain proper temperature conditions of the liquid in the sump and thus prevent coking in that region.

The invention is not limited to chambers of circular cross-section nor to baffles concentric with the pipe 13; as will be apparent from Figure 5. In this embodiment an elliptical chamber (which may be any other desired shape) is divided by walls 13a into two chambers 11, one on either side of a conduit 27 for entrapping liquid, either inlet or overflow. Material for treatment may be admitted to both chambers in any suitable manner, as by use of two separate inlets 12, or by a single inlet with intercommunication between the chambers. It is apparent that, if desired, a satisfactory modification of this embodiment may consist of one chamber 11, with the conduit 27 on one side thereof.

We claim:

1. Apparatus for separating tar from hydrocarbon oils comprising a substantially vertical cylindrical casing, a tangentially disposed inlet port in the wall of the lower portion of said casing, an oil inlet pipe extending upward from the bottom to near the top of said casing concentric therewith, an oil reservoir about the upper end of said pipe and spaced therefrom, an annular dam integral with and extending upwardly from the bottom of said reservoir and defining an annular opening therein concentric with said pipe, said dam having its upper edge substantially lower than the upper end of said pipe, means to admit oil to said reservoir, a sleeve about and spaced from said pipe in the lower part of said casing near said inlet port, a plurality of frusto-conical inner baffles above said port, each substantially concentric with said pipe and extending from said pipe upwardly toward said casing and having their outer edges spaced from said casing, an outer baffle between each pair of adjacent inner baffles parallel therewith, extending from said casing downwardly and having its inner edge spaced from said pipe, means between each of said inner baffles and said pipe defining a liquid seal to permit constant downward liquid flow between each inner baffle and said pipe and inhibiting upward flow of gases therebetween, means to withdraw gases from the top of said casing, and means to withdraw liquid from the bottom of said casing.

2. In an apparatus for separating entrained matter from gases by contacting said gases with a wall down the face of which is flowed a liquid, means for controlling the flow of said liquid comprising a liquid reservoir adjacent the upper edge of said wall, a dam extending upwardly from the bottom of said reservoir defining the vertical side thereof adjacent said wall and spaced therefrom to provide a passage for liquid between said dam and said wall, the top of said dam being substantially below the top of said wall, and means to admit liquid to said reservoir; whereby liquid supplied to said reservoir in excess of that for which the apparatus is designed will flow over the top of said wall and down the reverse side thereof.

3. A method for separating tar from hydrocarbon oils which comprises vaporizing said oils, maintaining a flow of flux oil down a substantially vertical surface and repeatedly effecting flow of the vaporized oils against said liquid at high velocity in successive curved paths countercurrent to said liquid and tangential to said surface.

4. A method for separating tar from hydrocarbon oils which comprises vaporizing said oils, maintaining a flow of flux oil down a substantially vertical surface, repeatedly effecting flow of the vaporized oils against said liquid at high velocity in successive curved paths countercurrent to said liquid and tangential to said surface, withdrawing flux oil from the bottom of said surface and recirculating at least a part thereof to the top of said surface.

5. In apparatus of the type described, enclosing means defining a chamber, means providing for downward flow of liquid in said chamber and having at least one vertical surface down which said liquid is caused to flow, at least one baffle extending from said enclosing means into said chamber toward said second-named means, a deflector on each side of said baffle extending substantially parallel thereto into said chamber from said second-named means, said vertical surface being between said deflectors, means to permit flow of liquid and inhibit flow of gases between each of said deflectors and said second-named means, means to separately admit gas and liquid to said chamber and means to separately withdraw gas and liquid from said chamber.

ERNEST UTTERBACK.
WILLIAM A. HAGERBAUMER.